United States Patent [19]
Feldkamp

[11] Patent Number: 5,365,780
[45] Date of Patent: Nov. 22, 1994

[54] MISFIRE DETECTION IN INTERNAL COMBUSTION ENGINE WITH OVERLAPPING POWER STROKES

[75] Inventor: Timothy M. Feldkamp, Ann Arbor, Mich.

[73] Assignee: Ford Motor Company, Dearborn, Mich.

[21] Appl. No.: 173,029

[22] Filed: Dec. 27, 1993

[51] Int. Cl.⁵ .......................................... G01M 15/00
[52] U.S. Cl. .................................................... 73/117.3
[58] Field of Search ................ 73/116, 117.2, 117.3; 364/431.08, 431.07

[56] References Cited

U.S. PATENT DOCUMENTS

| | | | |
|---|---|---|---|
| 5,041,980 | 8/1991 | Maddock et al. | 73/116 |
| 5,044,194 | 9/1991 | James et al. | 73/112 |
| 5,044,195 | 9/1991 | James et al. | 73/117.3 |
| 5,056,360 | 10/1991 | Dosdall et al. | 73/116 |
| 5,095,742 | 3/1992 | James et al. | 73/116 |
| 5,109,695 | 5/1992 | James et al. | 73/117.3 |
| 5,117,681 | 6/1992 | Dosdall et al. | 73/116 |
| 5,245,865 | 9/1993 | Kayanuma | 73/117.3 |
| 5,245,866 | 9/1993 | Hashiguchi et al. | 73/117.3 |
| 5,263,365 | 11/1993 | Müller et al. | 73/117.3 |

*Primary Examiner*—Hezron E. Williams
*Assistant Examiner*—George M. Dombroske
*Attorney, Agent, or Firm*—Mark Mollon; Roger L. May

[57] ABSTRACT

Incorrect classifications of misfires (potential false alarms) are reduced by comparing the power loss value for a particular cylinder event with the power loss values for neighboring cylinder events. A set of rules for the comparisons permits identifications of potential misfires that are, in reality, a normally firing cylinder event having a measurement that is altered by a neighboring misfire event, referred to as the pulling effect. The invention improves misfire detection accuracy, especially in internal combustion engines with 8 or more cylinders, which have substantially overlapping power strokes.

4 Claims, 2 Drawing Sheets

MISFIRE DETECTION IN INTERNAL COMBUSTION ENGINE WITH OVERLAPPING POWER STROKES

BACKGROUND OF THE INVENTION

The present invention relates in general to detecting misfires occurring during normal in-use vehicle operation of internal combustion engines and more specifically to identifying the occurrence of individual misfires with reduced false alarms or other errors.

Catalytic converters are used in automobiles to reduce the amount of pollutants in the engine exhaust. When a cylinder misfires so that no combustion or incomplete combustion occurs, uncombusted fuel is introduced into the exhaust which then burns in the hot catalytic converter. The heat from fuel burning in the catalytic converter destroys the catalyst. Thus, it becomes desirable to detect and count engine misfires and signal the operator of the vehicle upon occurrence of excessive misfires so that steps may be taken to protect the catalytic converter.

One of the best techniques for detecting misfires has been to monitor engine crankshaft acceleration, as described in commonly owned U.S. Pat. Nos. 5,044,194; 5,044,195; 5,056,360; 5,095,742; 5,109,695; and 5,117,681, which are hereby incorporated by reference. In these systems, the time to rotate through an angular interval associated with each engine cylinder is measured. Acceleration is calculated based on the time intervals and the acceleration values are processed to determine a power loss value associated with each cylinder. Power loss values are compared with a threshold to detect misfires.

Parameters for successful operation of these misfire detectors are quite demanding. For example, it is desirable to detect a misfire rate of about one or two percent since this rate can adversely affect emission levels. In addition, the identity of the misfiring cylinder associated with each individual misfire must be determined and stored to facilitate later servicing of an engine to correct the condition leading to the misfires. Typically, such diagnostic strategies must have very low false alarm rates, especially when detectors are deployed in large numbers of vehicles.

Misfire detection becomes more difficult as the number of cylinders in an engine increase above four due to the overlapping of power strokes. The overlap causes the acceleration effects of one cylinder to spill over into the acceleration measurement of adjacent cylinders in the firing order. Thus, a misfire in one cylinder may have a "pulling effect" on the acceleration values of the adjacent normally firing cylinders. This increases the likelihood of falsely declaring the adjacent firings as misfires.

SUMMARY OF THE INVENTION

The present invention has the advantage of reducing erroneous detections of misfire that result from overlapping power strokes in an engine. Thus, each potential misfire is compared with its neighbors to reduce detections of misfire resulting from the pulling effect.

In one aspect, the invention provides a method of detecting misfires of individual cylinder firings in a combustion engine wherein individual cylinder firings are classified as misfires and normal firings. Engine acceleration is measured corresponding to each of a plurality of cylinder firings during operation of the engine. A power loss value is determined for each cylinder firing with respect to others of the cylinder firings. Each power loss value is compared with a first predetermined loss indicative of misfire. If a respective power loss value is greater than the first predetermined loss, then (1) the immediate neighboring power loss values of the respective power loss value are compared with a second predetermined loss, and (2) a misfire is detected corresponding to the respective power loss value in response to the number of the immediate neighboring power loss values that are greater than the second predetermined loss.

DETAILED DESCRIPTION OF PREFERRED EMBODIMENTS

Figure 1:
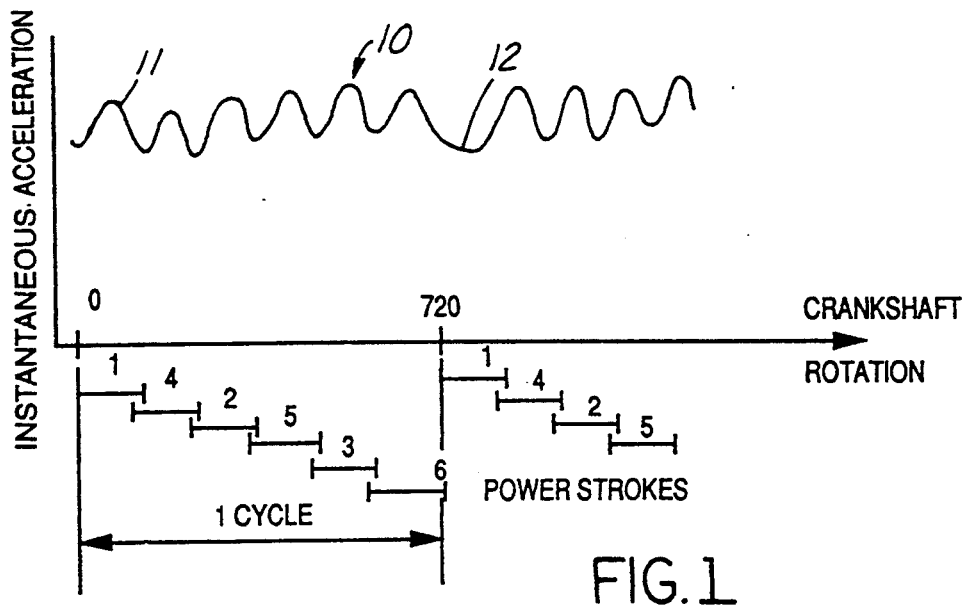
FIG. 1 is a plot showing instantaneous acceleration versus crankshaft rotation for normal and misfiring cylinders.

Curve 10 in FIG. 1 shows approximate acceleration fluctuation during engine operation. An instantaneous acceleration peak 11 occurs during the power stroke of cylinder No. 1. Other peaks occurring in the acceleration curve are shown as corresponding to the other normally firing cylinders. Thus, although power strokes overlap in engines with more than four cylinders (e.g., a six-cylinder engine as shown in FIG. 1), their individual effects are at least partially separable into distinct acceleration fluctuations which can be determined from velocity measurements made at a rate of once per cylinder firing.

When a misfire occurs such that no significant power is created by a cylinder during its power stroke, the crankshaft continues to decelerate throughout such rotation as illustrated at 12. The deceleration continues at least during the time that the missing cylinder is the only cylinder on its power stroke.

Figure 2:
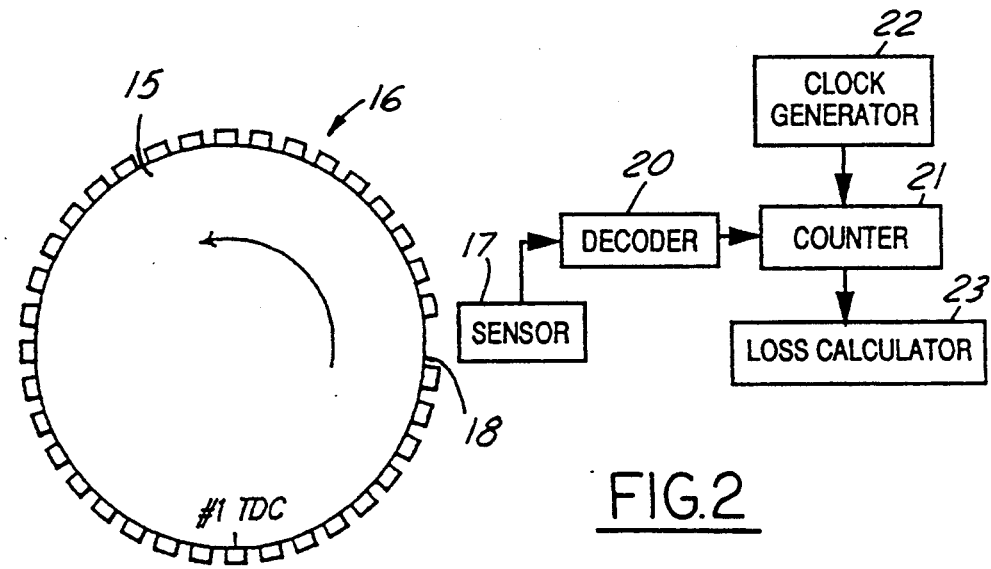
FIG. 2 is a block diagram showing measuring and calculating apparatus according to the present invention.

Apparatus for detecting misfires is shown in FIG. 2. A multi-tooth wheel 15 is mounted on an engine for rotation with the crankshaft. A plurality of teeth 16 are disposed along the periphery of wheel 15 at a predetermined angular spacing. A variable reluctance sensor 17 is disposed in a fixed location closely spaced to teeth 16 for sensing when each tooth passes sensor 17. A missing tooth location 18 is provided on wheel 15 to give an absolute location reference, for example, at 90° before top dead center of cylinder No. 1 as shown in FIG. 2. Alternative position sensing arrangements can be employed such as Hall-effect sensors associated with rotating vanes which are also employed in the art.

Sensor 17 is connected to a decoder 20 which provides a decoded output to a counter 31. A clock signal is provided to counter 21 by a clock generator 22. A counter output defining the time interval $\Delta T$ between decoded positions is provided to a loss calculator 23. Velocity and acceleration are calculated in loss calculator 23 based on the count generated between decoded positions defining an angular rotation interval for a predetermined cylinder power stroke. A cylinder identification sensor (not shown) is preferably employed to identify which cylinder is actually on a power stroke versus exhaust stroke. Based on the acceleration values, loss calculator 23 determines a power loss value for each cylinder firing as described in previously mentioned U.S. Pat. No. 5,109,695, for example. Thus, loss calculator 23 preferably receives input signals (not shown) characterizing such engine parameters as air flow and fuel rate in order to determine an expected torque in order to derive power loss values. Power loss values may be expressed as a percent power loss with respect to the expected power to be produced by a normally firing cylinder (i.e., zero percent power loss representing a normal full-power firing and 100 percent power loss representing a complete loss of power resulting from a misfire).

Figure 3:
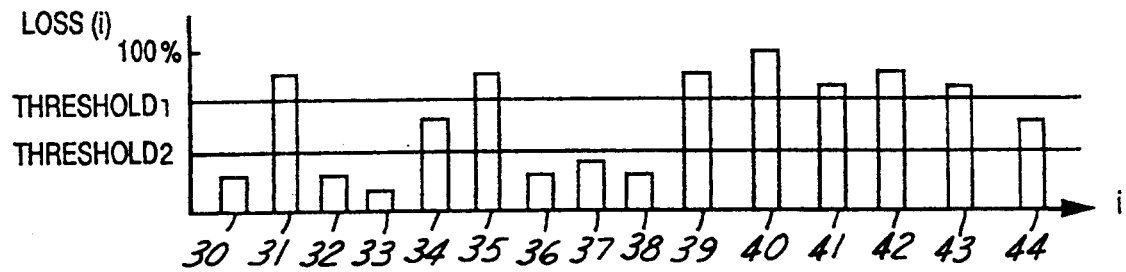
FIG. 3 is a bar chart showing hypothetical power loss values for respective cylinder firings.

FIG. 3 shows a plurality of hypothetical consecutive power loss values for the purpose of illustrating operation of the invention. In the prior art, THRESHOLD1 (for example, 70%) is employed to distinguish an event between a misfire and a normal firing. In an engine with overlapping power strokes (especially 8 and 10 cylinder engines), a misfiring cylinder event can have a significant pulling effect on neighboring power stroke calculations (i.e., the neighboring power loss values are increased). Proper stroke bracketing for determining acceleration measurements, as described in U.S. Pat. No. 5,056,360, can equalize the pulling effect on both neighbors but cannot eliminate it. Thus, it is possible for a single misfire to increase an adjacent power loss value making the adjacent value appear to be a misfire.

The present invention reduces false alarms due to the pulling effect by examining the immediate neighbors of each cylinder event in determining whether a cylinder event represents a misfire. FIG. 3 shows a plurality of power loss values 30–44. A potential misfire is first detected by comparison of each respective power loss value with THRESHOLD1. The neighbors (i.e., the preceding and succeeding power loss values) are examined to identify "big neighbors". A big neighbor is defined as a power loss value exceeding a second threshold THRESHOLD2 (for example, 50%) which is less than THRESHOLD1. The present invention employs the existence of and relative magnitude of big neighbors in order to identify and discard a potential misfire that is created by the pulling effect.

According to the present invention, if a particular loss value is less than THRESHOLD1, then the cylinder event is classified as a normal firing. If a respective loss value is greater than THRESHOLD1, then the number of big neighbors (i.e., zero, one, or two) is determined. If there are no big neighbors, then there could not be a pulling effect and the cylinder event is classified as a misfire. If only one big neighbor is found, then the power loss value of the cylinder event being examined is compared with the power loss value of the big neighbor. If the power loss value of the current cylinder is greater than the big neighbor, then the cylinder event is classified as a misfire. If the big neighbor is bigger than the current power loss value, then the pulling effect is presumed to have occurred and a normal firing is detected. If there are two big neighbors, then a misfire is detected if the current power loss value is greater than or equal to at least one of the big neighbors; otherwise a normal firing is detected.

Turning to the sample values shown in FIG. 3, the cylinder event leading to power loss value 31 is a potential misfire since it is greater than THRESHOLD1. Since power loss values 30 and 32 are less than THRESHOLD2, power loss value 31 has zero big neighbors and is classified as a misfire. Power loss value 35 is a potential misfire having one big neighbor. Since power loss value 35 is larger than its big neighbor 34, power loss value 35 is classified as a misfire. Power loss value 39 is also a potential misfire having one big neighbor. However, since big neighbor power loss value 40 is larger than power loss value 39, the cylinder event corresponding to power loss 39 is classified as a normal firing since it is likely that it was caused by the pulling effect.

Power loss values 40 and 41 are potential misfires (i.e., are greater than THRESHOLD1) and each have two big neighbors. Power loss value 40 is detected as a misfire since it represents a power loss greater than one or both of its big neighbors. In contrast, power loss value 41 is classified as a normal firing because it is not larger than either adjacent power loss value.

Power loss value 43 is greater than THRESHOLD1 and thus represents a potential misfire. It has two big neighbors of which power loss value 44 is greater than THRESHOLD2 but is not great enough to represent a potential misfire. Nevertheless, since power loss value 43 is greater than power loss value 44, a misfire is detected corresponding to power loss value 43.

Figure 4:
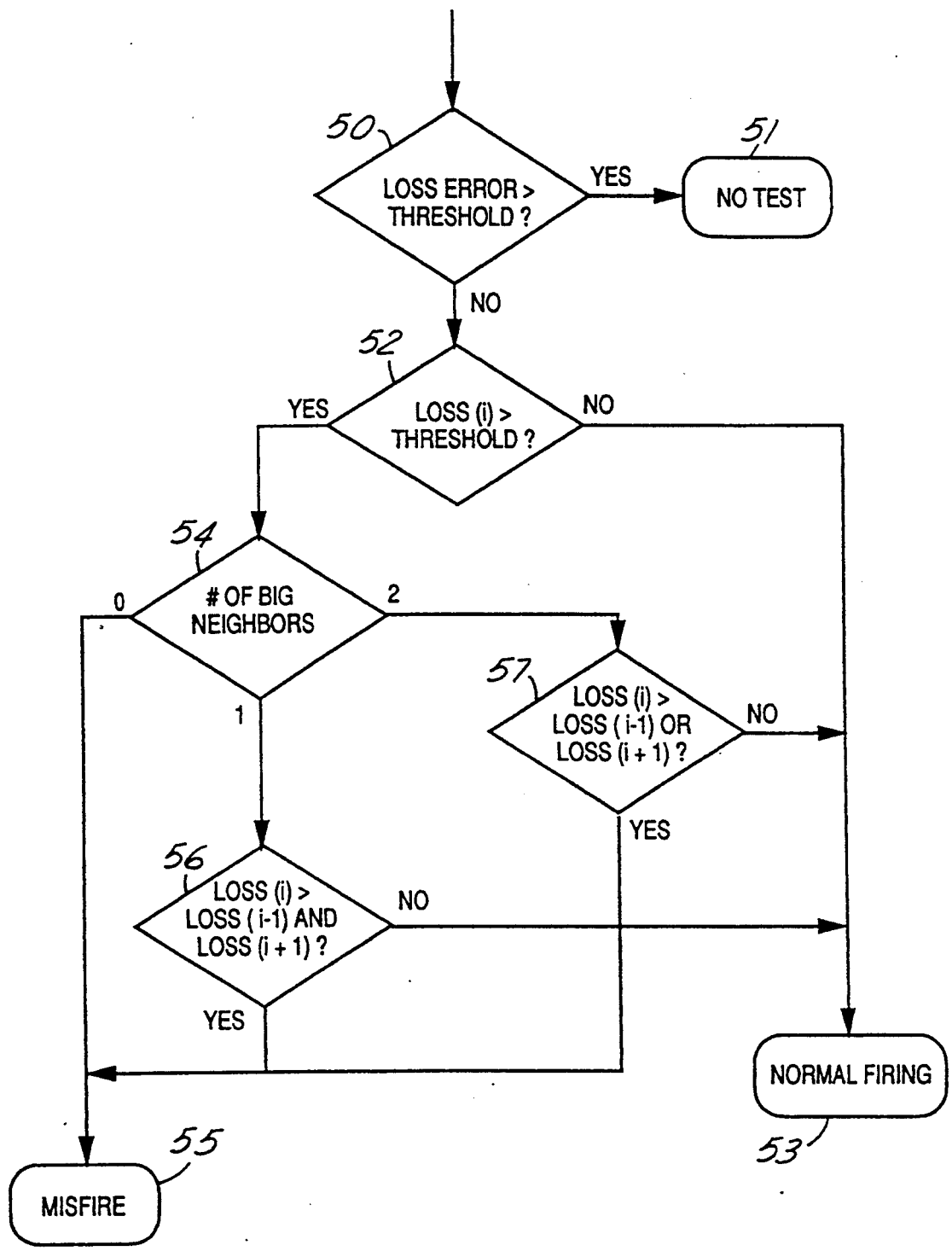
FIG. 4 is a flow chart illustrating improved misfire detection according to the present invention.

Turning now to FIG. 4, the method employed in the present invention classifies power loss values as follows. As described in the above-mentioned patents, each power loss value has an associated loss error for purposes of determining whether a reliable misfire classification can be made. In step 50, the loss error is compared to an error threshold. If the loss error is greater than the threshold, a No-Test condition is detected in step 51. Otherwise, a reliable classification can be made and the power loss value LOSS(i) is compared to THRESHOLD1 in step 52. If it is determined that LOSS(i) is less than THRESHOLD1, then a normal firing is detected in step 53.

If LOSS(i) is greater than THRESHOLD1, then the number of big neighbors of the potential misfire is determined in step 54. If there are no big neighbors, then a misfire is indicated in step 55. If one big neighbor is found, then LOSS(i) is compared to adjacent power loss values LOSS(i−1) and LOSS(i+1) in step 56. If LOSS(i) is greater than both neighbors, then a misfire is indicated in step 55; otherwise a normal firing is indicated in step 53. Alternatively, for the case of one big neighbor, one could keep track of which neighbor is the big neighbor and then only a comparison with that neighbor would be made.

If two big neighbors are detected in step 54, then LOSS(i) is compared to the neighboring power loss values in step 57. If LOSS(i) is greater than at least one of the adjacent neighbors, then a misfire is indicated in step 55; otherwise a normal firing is indicated in step 53.

After classification of a particular power loss value, the sample number i is incremented and the next power loss value is classified. As each cylinder event is classified, an overall misfire rate is determined as is described in co-pending application Ser. No. 08/042,257, for example.

The foregoing invention reduces false alarms for events incorrectly classified as misfires which result from the pulling effect of an actual misfire on an adjacent cylinder firing. The value or magnitude of THRESHOLD2 is calibrated to provide an acceptable trade-off between avoiding false alarms and the ability to detect consecutive misfires. The smaller the magnitude of THRESHOLD2, the better the ability to detect consecutive misfires but at a higher susceptibility to false alarms.

Another way to increase the ability to detect consecutive misfires (also at the expense of increased false alarms) is to add an incremental value Y on the order of several percent to each power loss value prior to comparison with its neighbors in steps 56 and 57 of FIG. 4. Thus, if two consecutive potential misfires are within Y of each other then they will both be classified as misfires.

What is claimed is:

1. A method of detecting misfires of individual cylinder firings in a combustion engine wherein individual cylinder firings are classified as misfires and normal firings, said method comprising the steps of:

measuring engine acceleration corresponding to each of a plurality of cylinder firings during operation of said engine;

determining a power loss value for each cylinder firing with respect to others of said cylinder firings;

comparing each power loss value with a first predetermined loss indicative of misfire;

if a respective power loss value is greater than said first predetermined loss, then 1) comparing the immediate neighboring power loss values of said respective power loss value with a second predetermined loss, and 2) detecting a misfire corresponding to said respective power loss value in response to the number of said immediate neighboring power loss values which are greater than said second predetermined loss.

2. The method of claim 1 wherein a misfire is detected in response to the further step of comparing said respective power loss value with said immediate neighboring power loss values.

3. The method of claim 2 wherein if said number of said immediate power loss values is zero then a misfire is detected, wherein if said number of immediate power loss values is one then a misfire is detected only if said respective power loss value is greater than both of said immediate neighboring power loss values, and wherein if said number of immediate power loss values is two then a misfire is detected if said respective power loss value is greater than either one of said immediate neighboring power loss values.

4. The method of claim 2 wherein a constant Y is added to said respective power loss value prior to comparison with said immediate neighboring power loss values.

* * * * *